United States Patent
Agarwal et al.

(10) Patent No.: US 10,901,824 B2
(45) Date of Patent: Jan. 26, 2021

(54) OPPORTUNISTIC OFFLINING FOR FAULTY DEVICES IN DATACENTERS

(71) Applicant: Microsoft Technology Licensing, LLC, Redmond, WA (US)

(72) Inventors: Saurabh Agarwal, Redmond, WA (US); Koon Hui Geoffrey Goh, Bellevue, WA (US); Asad Yaqoob, Redmond, WA (US); Shandan Zhou, Kenmore, WA (US); Karthikeyan Subramanian, Redmond, WA (US); Gowtham Natarajan, Redmond, WA (US); Vipin Kumar, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 126 days.

(21) Appl. No.: 16/041,708

(22) Filed: Jul. 20, 2018

(65) Prior Publication Data

US 2020/0026591 A1    Jan. 23, 2020

(51) Int. Cl.
*G06F 11/07* (2006.01)
*G06F 1/20* (2006.01)
(Continued)

(52) U.S. Cl.
CPC ............ *G06F 11/0709* (2013.01); *G06F 1/20* (2013.01); *G06F 1/3209* (2013.01);
(Continued)

(58) Field of Classification Search
CPC combination set(s) only.
See application file for complete search history.

(56) References Cited

U.S. PATENT DOCUMENTS

| 7,685,358 B1* | 3/2010 | Larson | G06F 11/2023 709/216 |
| 8,433,802 B2* | 4/2013 | Head | G06F 9/5077 709/226 |

(Continued)

FOREIGN PATENT DOCUMENTS

WO    03102772 A2    12/2003

OTHER PUBLICATIONS

Hung, et al., "MobileFBP: Designing Portable Reconfigurable Applications for Heterogeneous Systems", In Proceeding of Journal of Systems Architecture, vol. 60, Issue 1, Jan. 2014, pp. 40-51.

(Continued)

*Primary Examiner* — Amine Riad

(57) ABSTRACT

Embodiments relate to determining whether to take a resource distribution unit (RDU) of a datacenter offline when the RDU becomes faulty. RDUs in a cloud or datacenter supply a resource such as power, network connectivity, and the like to respective sets of hosts that provide computing resources to tenant units such as virtual machines (VMs). When an RDU becomes faulty some of the hosts that it supplies may continue to function and others may become unavailable for various reasons. This can make a decision of whether to take the RDU offline for repair difficult, since in some situations countervailing requirements of the datacenter may be at odds. To decide whether to take an RDU offline, the potential impact on availability of tenant VMs, unused capacity of the datacenter, a number or ratio of unavailable hosts on the RDU, and other factors may be considered to make a balanced decision.

17 Claims, 9 Drawing Sheets

(51) Int. Cl.
*G06F 1/3209* (2019.01)
*G06F 9/455* (2018.01)
*G06F 11/20* (2006.01)
*G06F 11/34* (2006.01)

(52) U.S. Cl.
CPC ...... *G06F 9/45558* (2013.01); *G06F 11/2023* (2013.01); *G06F 11/34* (2013.01); *G06F 2009/45575* (2013.01); *G06F 2009/45591* (2013.01)

(56) References Cited

U.S. PATENT DOCUMENTS

| | | |
|---|---|---|
| 9,450,873 B2* | 9/2016 | Greenberg .............. H04L 47/12 |
| 2012/0297236 A1* | 11/2012 | Ziskind ............... G06F 11/1484 714/3 |
| 2012/0331521 A1 | 12/2012 | Ansari |
| 2017/0168907 A1 | 6/2017 | Harper et al. |
| 2017/0192825 A1 | 7/2017 | Biberman et al. |
| 2018/0196724 A1 | 7/2018 | Li et al. |

OTHER PUBLICATIONS

Osanaiye, et al., "From Cloud to Fog Computing: A Review and a Conceptual Live VM Migration Framework", In Proceeding of IEEE Access, vol. 5, Apr. 12, 2017, pp. 8284-8300.

"International Search Report and Written Opinion Issued in PCT Patent Application No. PCT/US2019/037826", dated Aug. 16, 2019, 13 Pages.

Singh, et al., "Cloud Security Issues and Challenges: A Survey", In Journal of Network and Computer Applications, vol. 79, Issue 1, Feb. 2017, pp. 88-115.

* cited by examiner

OPPORTUNISTIC OFFLINING FOR FAULTY DEVICES IN DATACENTERS

BACKGROUND

Datacenters, compute clouds, clusters, and the like consist of many host devices formed into a cohesive computing resource by a variety of software and hardware assets. The hardware assets usually include resource distribution units (RDUs) which supply respective sets of datacenter hosts with a resource such as power, networking, cooling, control signaling, etc. A cloud or datacenter may also include a fabric for controlling hosts, virtual machines (VMs), network state, and hardware assets. Hosts, perhaps VMs, and hardware assets such as RDUs may have fabric components or agents that enable interfacing with the fabric and carrying out fabric operations.

Inevitably, RDUs experience failures, sometimes at the hardware level. For some types of RDUs, an RDU failure may immediately cause the corresponding resource, for instance network service, to fail for all of the hosts parented by the failed RDU. In such cases, the hosts parented by the failed RDU may effectively be unavailable for tenants of the datacenter and it is a straightforward decision to replace the faulty RDU as soon as possible to bring the corresponding hosts back online. However, in some other cases, RDUs may be faulty and yet continue to supply their resource to their hosts. Often, such failures are at the control layer; a fabric component or controller for fabric communication may fail. As observed only by the inventors, in these situations, deciding whether to repair or replace a faulty RDU may not have a straightforward answer.

Consider the case of a power distribution unit (PDU) equipped with a controller. The PDU may provide power individually to datacenter hosts. The PDU's controller may be used by the fabric for power-control functions such as turning power on or off for specific hosts. If a PDU's controller fails, power-control functionality for the PDU's hosts might become unavailable, yet the PDU might continue supplying power to its hosts. As observed by the inventors, in this situation, whether to take the failed RDU/PDU offline is not a straightforward decision for the datacenter operator. Since the RDU is possibly still supplying its resource to some hosts which may remain online and available to tenants, taking the RDU offline for repair might affect tenants of the hosts; their tenant components hosted by the hosts, for instance VMs, may become unavailable if the RDU is taken offline. As further appreciated only by the inventors, the capacity of the datacenter might be taxed. On the other hand, if the RDU is not repaired, hosts parented by the RDU that become organically unavailable may not be able to be brought back online until the RDU has been replaced or repaired. For instance, to revive an affected host may require a resource or a control thereof that the failed RDU cannot provide. In short, some hosts may become unavailable until a repair occurs.

Techniques related to opportunistically offlining faulty datacenter devices are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to determining whether to take a resource distribution unit (RDU) of a datacenter offline when the RDU becomes faulty. RDUs in a cloud or datacenter supply a resource such as power, network connectivity, and the like to respective sets of hosts that provide computing resources to tenant units such as virtual machines (VMs). When an RDU becomes faulty some of the hosts that it supplies may continue to function and others may become unavailable for various reasons. This can make a decision of whether to take the RDU offline for repair difficult, since in some situations countervailing requirements of the datacenter may be at odds. To decide whether to take an RDU offline, the potential impact on availability of tenant VMs, unused capacity of the datacenter, a number or ratio of unavailable hosts on the RDU, and other factors may be considered to make a balanced decision.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
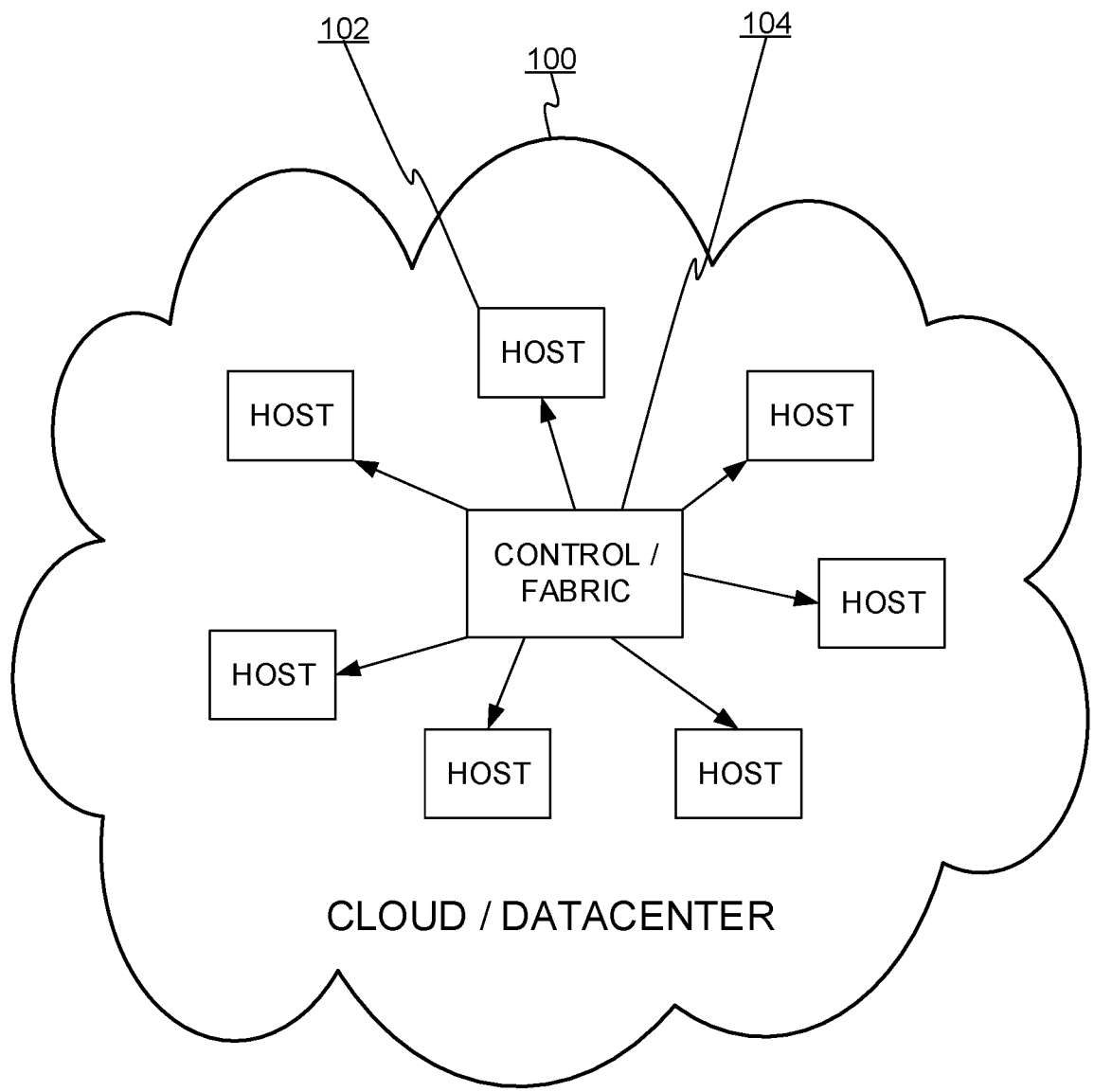
FIG. 1 shows a datacenter.

FIG. 1 shows a datacenter 100. The term "datacenter", as used herein, refers to any known arrangement of co-located computing hosts 102 controlled by a control fabric 104 to present the hosts 102 as a cohesive set of services and resources available to tenants. The term is considered to encompass compute clouds and the like, whether providing software as a service, platforms as a service, or combinations thereof. The datacenter 100 typically includes a control or management layer—fabric 104—which is mostly transparent to tenants of the datacenter and which provides the tenants with access to computing on the hosts 102. Computing may be presented as services, platforms, virtualization units such as VMs or containers, etc. The fabric 104 is responsible for maintaining the hosts 102, for instance upgrading host operating systems, installing fabric components, provisioning the hosts with resources (discussed with reference to FIG. 2), configuring assets of the datacenter to accommodate hosts, and so forth. Usually, the fabric 104 is implemented by multiple cooperating server hosts which communicate with fabric components executing on the hosts, e.g., software agents, services, virtualization modules, and others. Most datacenters also include a physical data network that enables fabric-host and host-host communication. Virtualized networks may be layered on top of the underlying data network.

Figure 2:
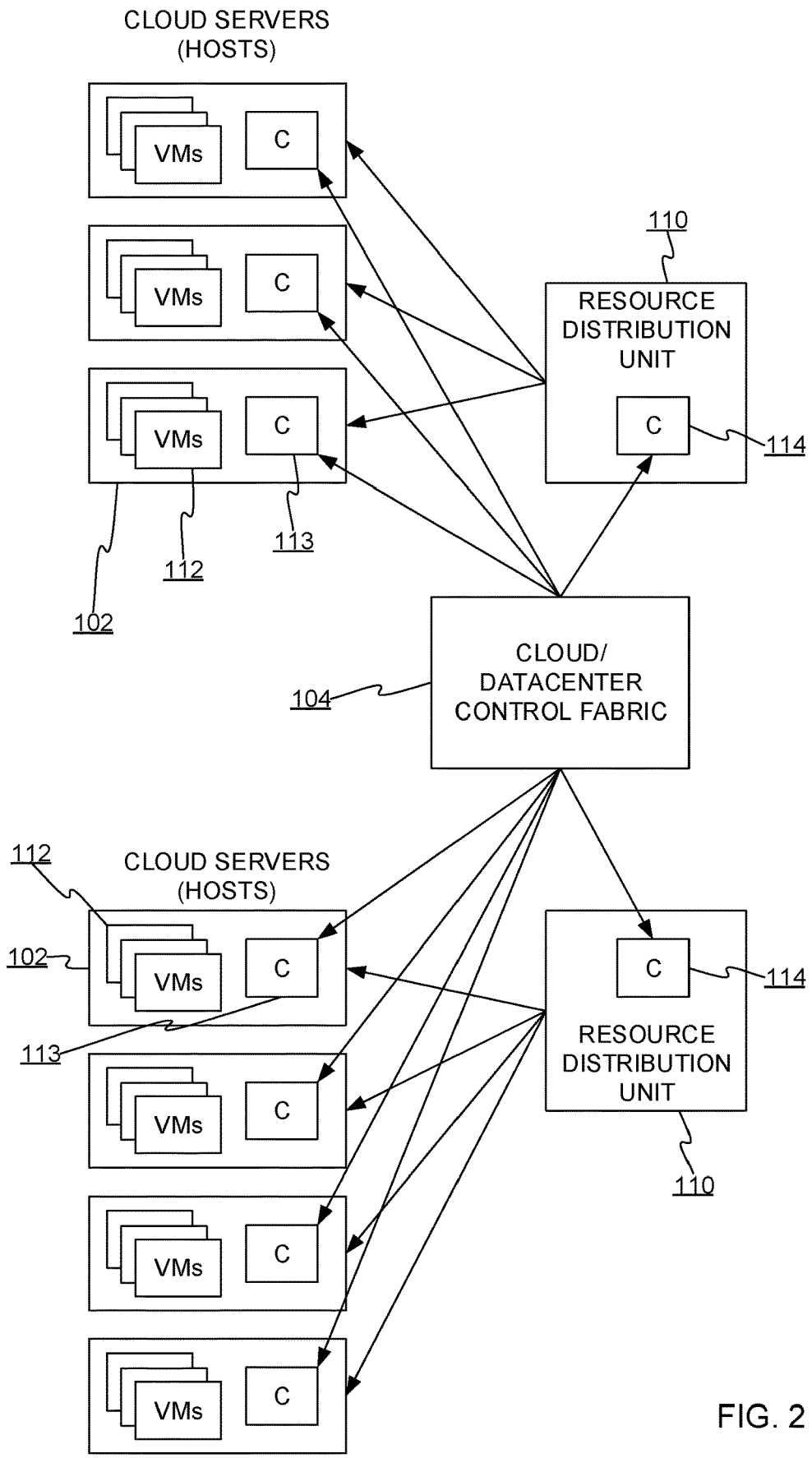
FIG. 2 shows details of hosts and resource distribution units (RDUs) in a datacenter.

FIG. 2 shows details of typical hosts 102 and resource distribution units (RDUs) 110 in a datacenter. Each host 102 may have tenant components which can be shifted from one host to another as workloads change, tenant needs change, and hosts are added and removed. The tenant components typically are virtualized components such as VMs 102 or containers. In that case, hosts 102 have virtualization layers for virtualizing tenant access to the hosts. However, tenant components may also be non-virtualized components such as applications, user accounts, and others. For discussion, VMs 112 will represent tenant components. The hosts may also include host control logic 113 that communicates with the fabric 104 for purposes described above.

The datacenter also includes RDUs 110. Each RDU 110 has a set of hosts 102 that the RDU supplies a resource to. As noted in the Background, an RDU might supply power, network connectivity, cooling, control or management signaling, and the like. Even a single node or host with say 8 disks can be considered an RDU. The number of disks to fail, the tenant affect if any, affects on datacenter capacity, etc., are applicable to the embodiments described herein. Each RDU 110 may also include a controller 114, which may be a separate module or an integral part of the RDU. For some types of RDUs, control functionality may fail and yet the RDU may continue to supply its resource to the hosts that it is parenting. This often occurs with power distribution units (PDUs) that supply power to individual hosts. Some PDUs may supply power to a set of dozens or more hosts. The PDU usually has a power feed for each respective host that it is parenting. Moreover, the controller of the PDU allows the fabric to control the power supply of individual hosts. For instance, the control fabric may send a message to a PDU to turn an individual host's power on or off, for example.

Of note is the idea that an RDU might become faulty but remain partially operational. Some attached hosts may continue to function, perhaps receiving the resource supplied by the faulty RDU. At the same time, other hosts may become unavailable for various reasons such as lack of a critical patch, host hardware or software failure, or others. The faulty RDU might make it impossible for the fabric to bring some of its hosts back online or into a state of being available for tenant components.

Figure 3:
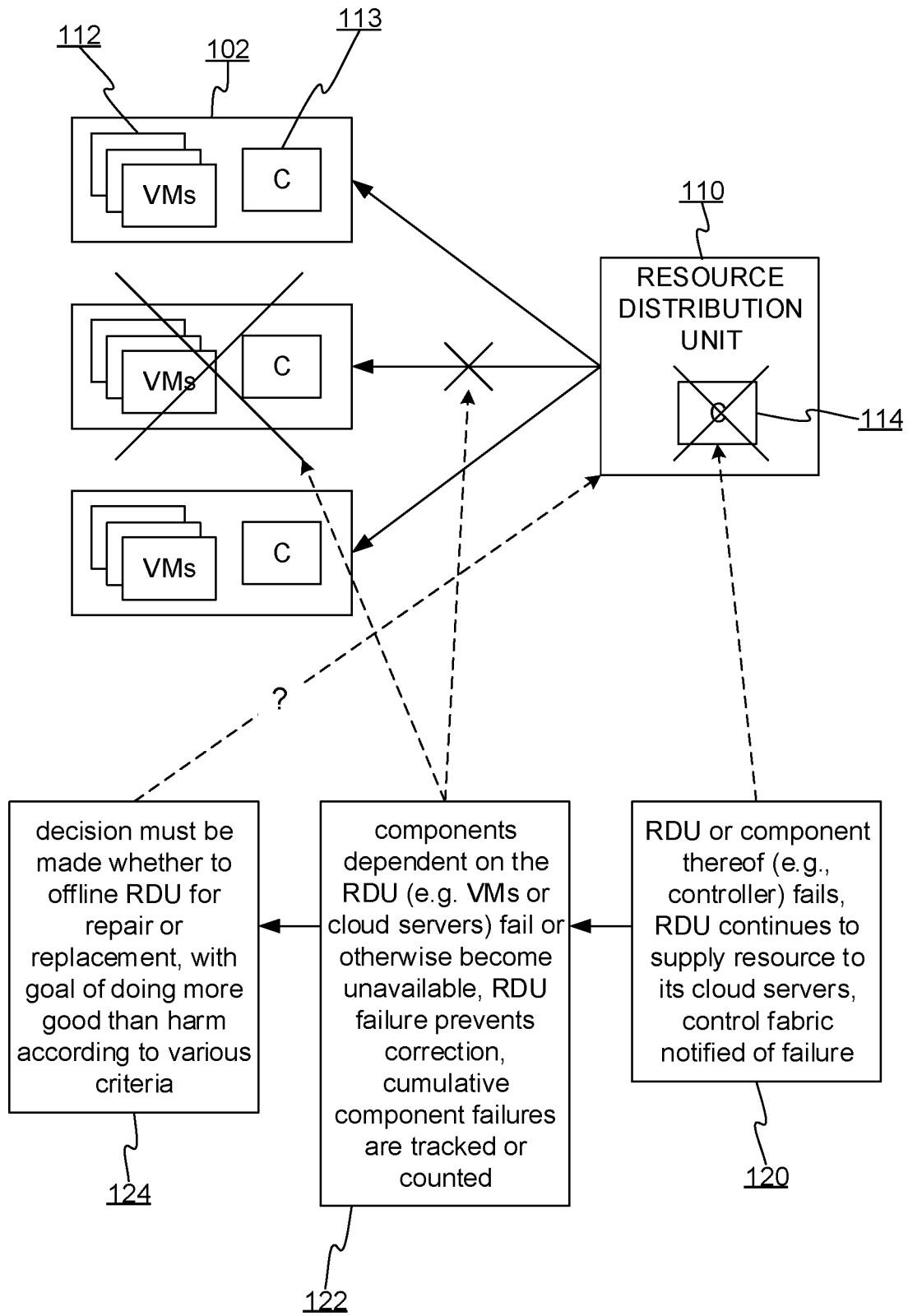
FIG. 3 illustrates effects of an RDU failure.

FIG. 3 illustrates how an RDU failure can create a situation of hosts with mixed availability that complicates the decision of when to repair the failed RDU. At a first time 120, the RDU experiences a fault. For example, its controller 114 may fail. The RDU continues to supply its resource to the relevant hosts and the fabric is possibly notified of the failure. At a later second time 122, the hosts dependent on the failed RDU may continue to execute. Over time, hosts and or resource provisioning to some hosts may fail. The RDU might stop supplying power to a host. Some manipulation of the supplied resource might be needed to render a host available for service, for example turning on power. Nonetheless, other hosts or the RDU may continue to operate and execute tenant components. At a third time 124 the operator of the datacenter is faced with the decision of whether to take the RDU out of service for repair or replacement. Because some hosts may still be functioning, taking the RDU out of service may impact availability of affected tenant components. Taking the RDU offline might also require shifting tenant components to other hosts of the datacenter, for instance migrating VMs to hosts of non-faulty RDUs, which can reduce the available capacity of the datacenter.

Figure 4:
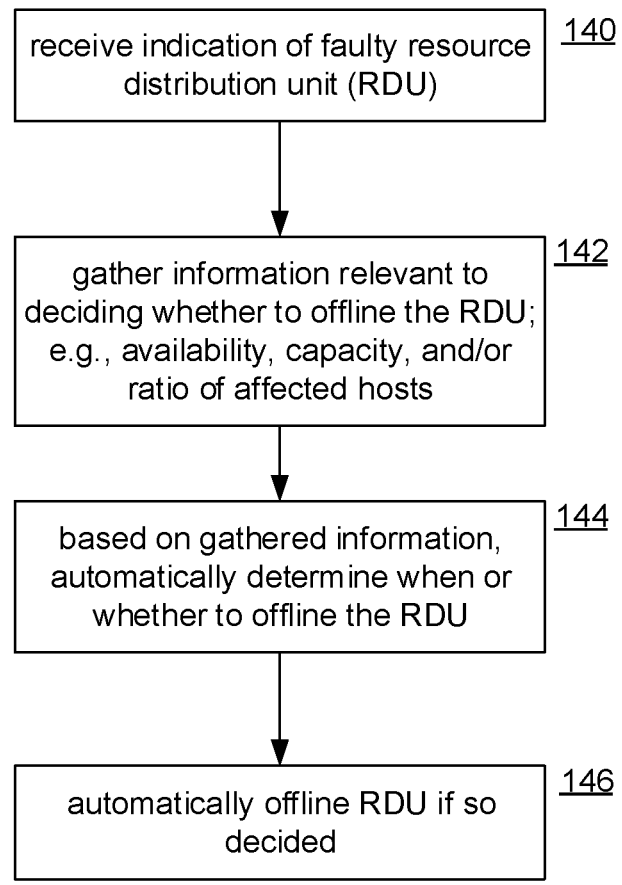
FIG. 4 shows a general process for deciding whether to take a faulty RDU offline for repair.

FIG. 4 shows a general process for deciding whether to take a faulty resource distribution unit (RDU) offline for repair. At step 140 the datacenter fabric receives an indication that an RDU is faulty. This may cause the control fabric to start various processes such as monitoring the RDU's state, monitoring the state of affected hosts and tenant components, collecting information about the state of the datacenter, and using the information about the datacenter and the state of the affected hosts and tenant components to decide whether to take the RDU offline for repair.

At step 142, the fabric gathers information relevant to deciding whether to offline the faulty RDU. For example, the fabric may gather or monitor availability of all hosts (or tenant-servicing hosts) in the datacenter, overcall available capacity of the datacenter (e.g., in terms of processing capacity, storage capacity, etc.) at present or as estimated for the future, network bandwidth at points of possible relevance, etc. Any factors may be taken into account that involve countervailing costs and benefits for the datacenter operator and tenants from taking the RDU offline or allowing it to continue to provision its hosts. At step 144, the gathered information is evaluated to determine whether to offline the RDU, and at step 146, the faulty RDU is automatically taken offline if such a decision has been made at step 144.

The information gathering of step 142 may involve various methods for making a decision, such as programming logic that implements a decision tree, a machine learning algorithm, adding weighted scores for different factors, and so forth. After describing some of the information or sub-decisions that may be collected for deciding how to dispose of a faulty RDU, an example decision tree is described with reference to FIG. 8.

Figure 5:
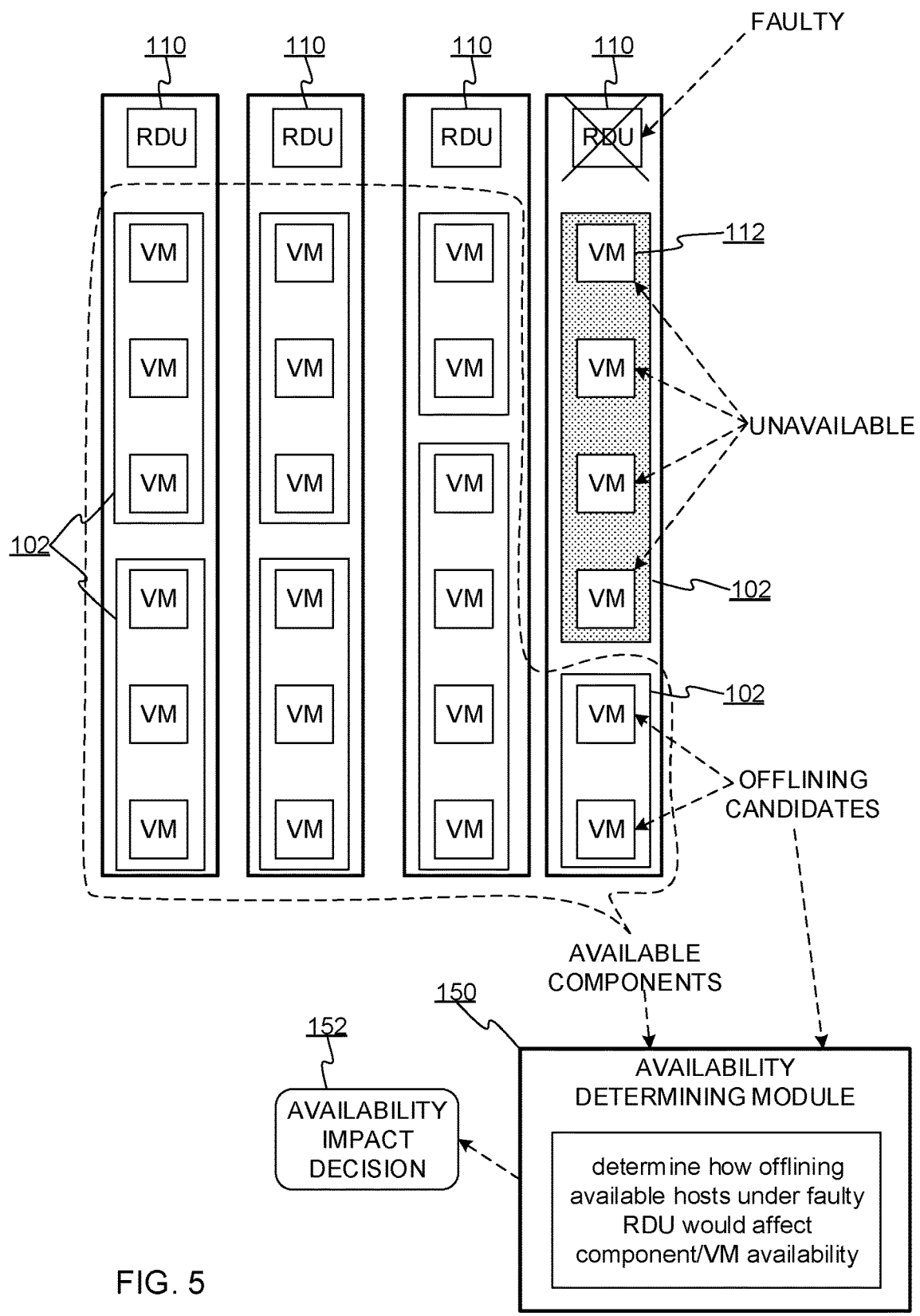
FIG. 5 shows an example of deciding whether tenant availability weighs for or against taking a faulty RDU offline.

FIG. 5 shows an example of deciding whether tenant availability weighs for or against taking a faulty RDU offline. An availability determining module 150, which may be part of the datacenter's control fabric, collects information relevant to deciding whether taking the RDU offline would sufficiently impact tenant component availability. In one embodiment, a count of tenant components (e.g., VMs) on the relevant hosts that are still operational is collected, for instance by polling a fabric controller. In some cases, the RDU's controller may be queried. In another embodiment, a count of unavailable tenant components is also collected (e.g., tenant VMs that are unavailable due to their host being unavailable). When information relevant to tenant component availability has been gathered, the availability determining module 150 determines whether offlining the faulty RDU would sufficiently impact availability, which may be issued in the form of an availability impact decision 152.

The decision itself can be performed using a variety of formulas, tunable parameters, and heuristics. What constitutes sufficient or insufficient availability will depend to a large extent on the expectations of tenants. Some tenants will expect all of their components to be available all of the time; no unavailability is acceptable. In this case, the decision may be as simple as: will offlining the faulty RDU cause any tenant components to become unavailable. If there are unavailable hosts due to the faulty RDU, but those hosts do not host tenant components, then offlining the RDU will not negatively impact tenant availability. Alternatively, a tunable threshold number of components may be used to define an acceptable loss of availability, e.g., 3 tenant VMs.

Unacceptable availability may depend on a trait of the potentially affected tenants. There may be tenants with some tolerance for unavailability. Another approach may be to compare how many tenant VMs are already unavailable against how many would be unavailable if the RDU were taken out of service. If the tenant components on the faulty RDU are mostly unavailable, then the impact on availability may be deemed acceptable. If a proportional availability approach is used, the decision may similarly take into account availability within the rest of the datacenter.

Figure 6:
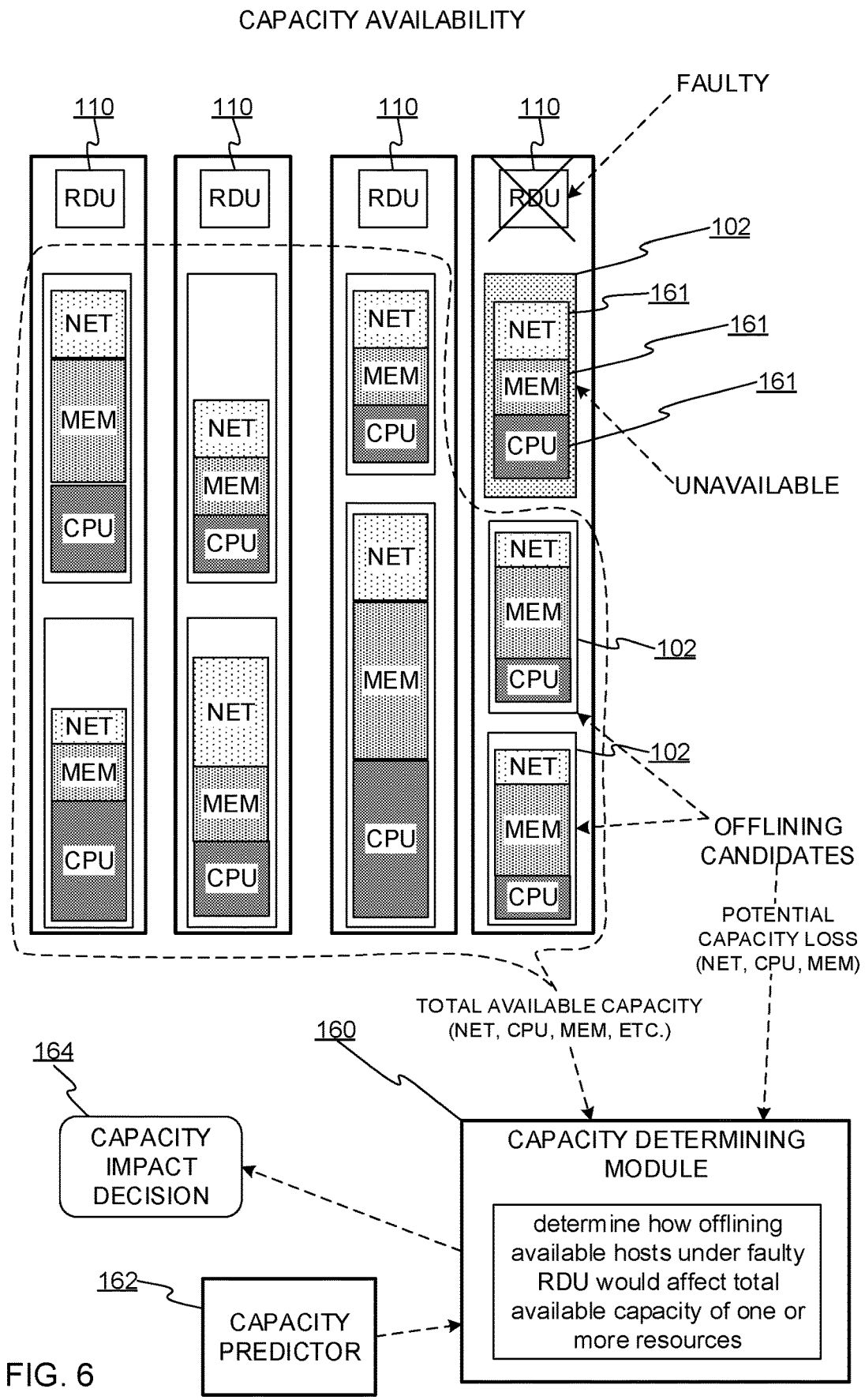
FIG. 6 shows an example of deciding whether datacenter capacity would be unacceptably impacted by offlining a faulty RDU.

FIG. 6 shows an example of deciding whether datacenter capacity would be unacceptably impacted by offlining a faulty RDU. A capacity determining module 160 collects information that indicates current resource capacity of the datacenter. Resources 161 may include network bandwidth, memory, processing capacity, and similar resources. The capacity determining module 160 may gather from a fabric controller a current estimated total resource capacity of the datacenter. The capacity may be in terms of available unused capacity and/or total capacity of the datacenter.

The capacity status may also be supplemented by a capacity predictor 162. The capacity predictor 162 uses machine learning to predict capacity for upcoming times. For instance, if on average it takes two days to replace an RDU then a prediction for capacity in two days may be obtained. For additional details on capacity prediction, see U.S. patent application Ser. No. 15/828,159, filed Nov. 30, 2017, titled "AUTOMATED CAPACITY MANAGEMENT IN DISTRIBUTED COMPUTING SYSTEMS".

The capacity determining module 160 also collects information about the datacenter capacity reduction that would occur if the faulty RDU were taken out of service for repair. The available and/or allocated resources of the hosts 102 still functioning under the faulty RDU are queried from a fabric controller or server and added together. This potential capacity reduction of the datacenter from offlining the RDU (and the corresponding hosts) is then subtracted from current and/or predicted resource capacity of the datacenter. The capacity determining module 160 then determines whether any current and/or future resource capacity rule would be violated by offlining the RDU. There may be a threshold minimum amount of resource capacity that needs to be held in reserve to handle load spikes. The rule may instead be that offlining must not lower the datacenter's resource capacity below zero. Different resources may have different rules. An overall resource capacity impact may be evaluated by finding potential reduction of different types of resources and then combining those results in a weighted manner or the like.

Finally, the capacity determining module 160 outputs a capacity impact decision 164 that indicates whether datacenter would be unacceptably impacted by offlining the faulty RDU and hence its associated hosts.

Figure 7:
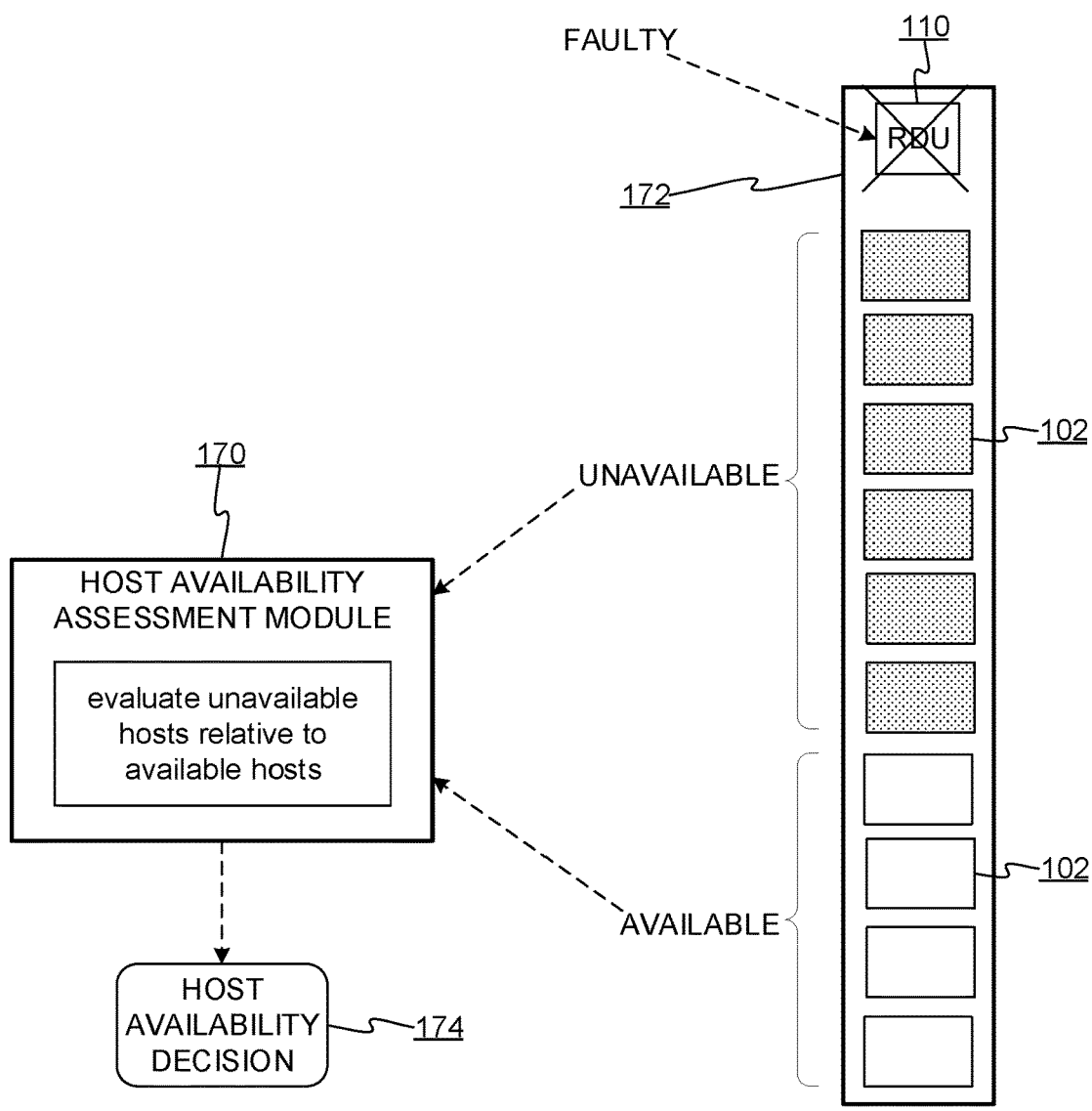
FIG. 7 shows how the status of hosts under a faulty RDU can be used to form another decision basis.

FIG. 7 shows how the status of hosts under a faulty RDU can be used to form another decision basis. One factor that can be used in deciding whether to offline an RDU is the number of available hosts relative to the number of unavailable hosts. As has been noted, hosts under a faulty RDU over time may become unavailable. They might also be unavailable because of the faulty RDU. A host availability assessment module 170 counts the number of available hosts and unavailable hosts among the set 172 of hosts parented by the RDU. A host availability measure is then computed. For instance, a difference between the number of available and unavailable hosts may be computed. Alternatively, a ratio of available hosts to unavailable hosts is computed. Whatever metric is used is tested against a threshold. For instance, if the threshold is 50% availability, then if more than half of the hosts in the host set 172 are already unavailable then the host availability assessment module 170 outputs a host availability decision 174 indicating that an inadequate number/ratio of hosts are available under the affected RDU.

Figure 8:
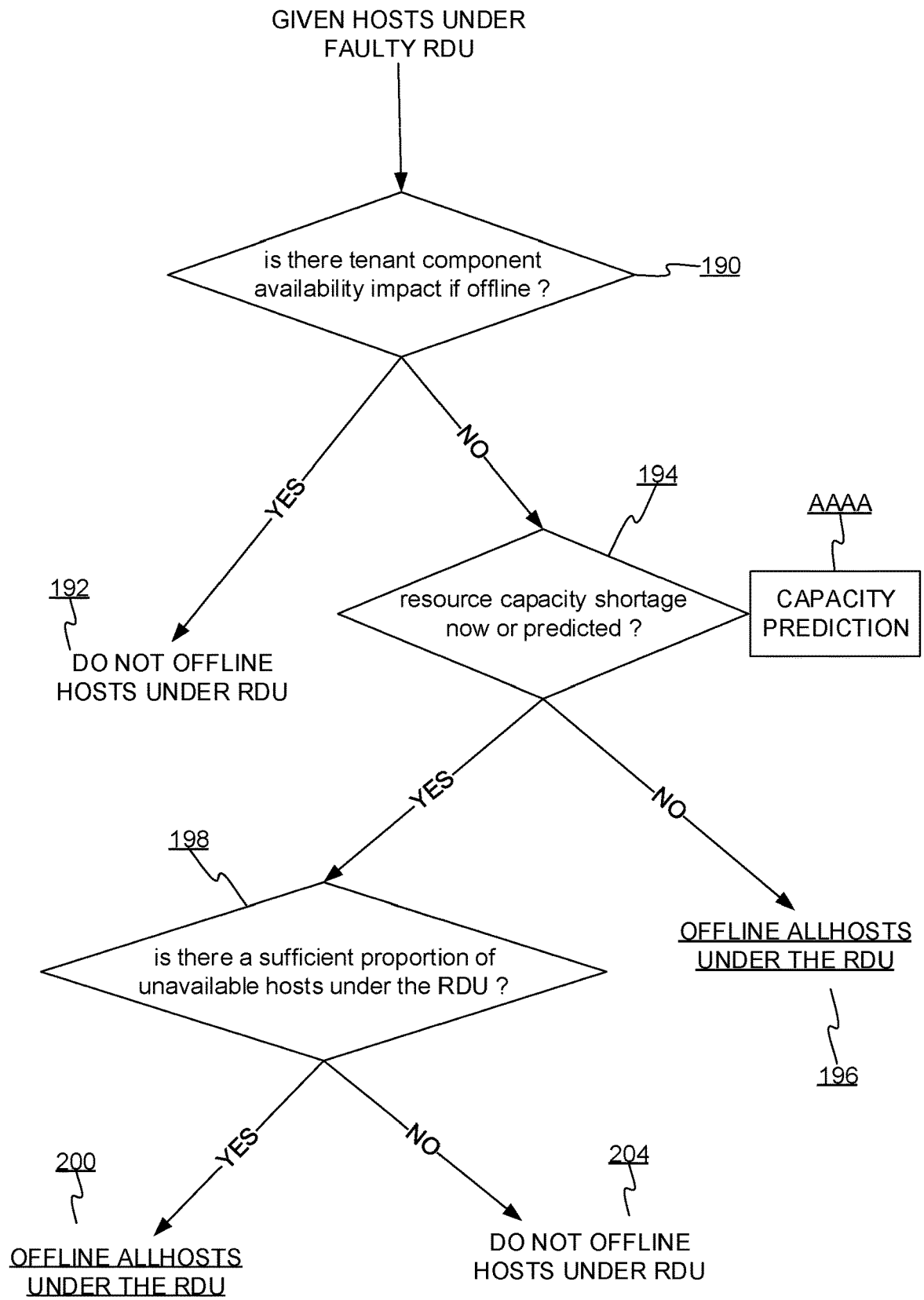
FIG. 8 shows an example of a decision tree that may be used to automatically decide whether to offline a faulty RDU.

FIG. 8 shows an example of a decision tree that may be used to automatically decide whether to offline a faulty RDU. The outputs of the decision modules described in FIGS. 5-7 may inform the decision tree. The decision tree may be implemented by one or more modules of the datacenter fabric. A first decision 190 is whether tenant component availability would be unacceptably affected by offlining the faulty RDU. The availability impact decision 152 output by the availability determining module 150 is evaluated. If offlining the faulty PDU would cause an unacceptable amount of tenant component availability, then there is a first decision 192 not to offline the RDU. However, if tenant availability would not be negatively impacted ("NO" from first decision 190), then a second decision 194 is made.

The second decision 194 evaluates the capacity impact decision 164 from the capacity determining module 160 and possibly with a capacity prediction 196 from the capacity predictor 162. If offlining the RDU would not create an unacceptable present and/or future shortcoming resource capacity, then a second decision 196 is reached to offline the RDU and by implication its set of hosts. If it is decided that a resource capacity shortage would occur, then a third decision 198 is reached ("YES" from second decision 194). The third decision 198 evaluates the host availability decision 174 from the host availability assessment module 170 to decide whether to offline the RDU. If a sufficient proportion or number of hosts under the faulty RDU are already unavailable, then a third decision 200 is to offline the RDU. Otherwise, there is a fourth decision 202 not to offline the RDU.

Figure 9:
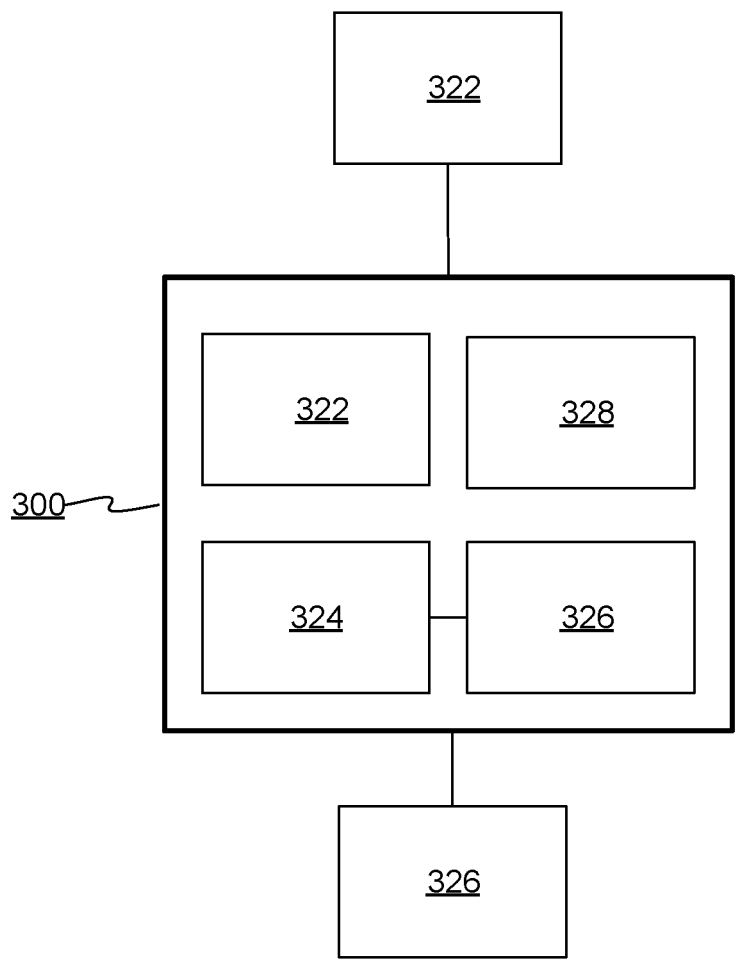
FIG. 9 shows details of a computing device on which embodiments described herein may be implemented.

FIG. 9 shows details of a computing device 300 on which embodiments described above may be implemented. The computing device 300 may be a fabric controller for a datacenter, although the logic described may be implemented on any device communicating with the relevant datacenter. The datacenter hosts may also be embodied as variants of the computing device 300; some may not have displays or may have other attributes typical of datacenter hosts. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 (possibly via cloud APIs) to implement the embodiments described herein.

The computing device 300 may have one or more displays 322, a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 300 may have any form-factor or may be used in any type of encompassing device. The computing device 300 may be in the form of a handheld device such as a smartphone, a tablet computer, a gaming device, a server, a rack-mounted or backplaned computer-on-a-board (i.e., a blade computer), a system-on-a-chip, or others.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by one or more control server devices participating in a cloud fabric that controls a compute cloud, the compute cloud comprised of a plurality of cloud server devices, the compute cloud further comprising power distribution units (PDUs), each PDU servicing a respective set of the cloud server devices, the cloud server devices hosting tenant components of tenants of the compute cloud, the method comprising:
   receiving a notification that a PDU is in a failure state, the PDU servicing a set of the cloud server devices, wherein the PDU comprises a controller, and wherein the PDU is configured to provide power to respective cloud server devices as controlled by the controller, wherein the PDU is configured to supply power while the controller is not able to respond to signals for controlling the supplying of power to the cloud server devices; and
   based on the notification, determining whether to place the PDU in a state of unavailability, wherein when the PDU enters the unavailable state each of the cloud server devices in the set of cloud server devices consequently becomes unavailable if not already unavailable, and wherein the determining whether to place the PDU in a state of unavailability comprises:
      determining, based on the set of cloud server devices:
         (i) a measure of availability of a population of the tenant components, and (ii) a measure or prediction of capacity for a resource of the compute cloud.

2. A method according to claim 1, wherein the determining whether to place the PDU in a state of unavailability is further based on a ratio of tenant components on the set of cloud server devices to tenant components on the set of cloud server devices that are already unavailable.

3. A method according to claim 2, wherein the ratio is computed based on a determination that making the set of cloud server devices unavailable corresponds to changing the measure or prediction of capacity within a threshold.

4. A method according to claim 3, further comprising determining to make the set of cloud server devices unavailable based on determining that the ratio satisfies a corresponding threshold.

5. A method according to claim 1, wherein
   (i) the determining, based on the set of cloud server devices, a measure or prediction of capacity for a resource of the compute cloud,
   is (ii) based on determining that the measure or prediction of capacity does not satisfy a corresponding threshold if the set of cloud server devices became unavailable.

6. A method according to claim 1, further comprising determining to make the set of cloud server devices unavailable based on based on determining that if the set of cloud server devices became unavailable the measure or prediction of capacity continues to satisfy a corresponding threshold.

7. A method according claim 1, wherein the tenant components comprise virtual machines managed by the compute cloud.

8. A method performed by one or more computing devices comprising processing hardware and storage hardware, the method for determining whether to offline a power distribution unit (PDU) in a datacenter, the datacenter comprised of PDUs providing power to respective sets of datacenter hosts that service tenant components of datacenter tenants, the method comprising:
   receiving an indication that the PDU is in a fault state, wherein the PDU continues to supply power to the set of datacenter hosts while the PDU is in the fault state, the fault state corresponding to the PDU not responding to control signals for controlling the supplying of power by the PDU while supplying power to the set of datacenter hosts;
   collecting, and storing in the storage hardware, capacity information indicating net available capacity of a computing resource of the datacenter;
   collecting, and storing in the storage hardware, tenant availability information indicating presence of tenant components on or more hosts receiving power from the PDU; and
   based on the indication that the PDU is in the fault state, determining, by the processing hardware, whether to offline the PDU, the determining comprising:
      (i) according to the capacity information in the storage hardware, computing a predicted net available capacity of the computing resource based on assuming offlining of the PDU, and
      (ii) according to the tenant availability information in the storage hardware, computing a predicted tenant availability measure based on assuming offlining of the PDU.

9. A method according to claim 8, wherein the determining whether to offline the PDU further comprises determining whether the computed predicted net available capacity is below a minimum capacity designated for the datacenter.

10. A method according to claim 9, wherein the determining whether to offline the PDU further comprises determining whether the predicted tenant availability measure is below an availability threshold.

11. A method according to claim 10, wherein the determining whether to offline the PDU further comprises determining that the predicted net available capacity is below the minimum capacity and based thereon determining whether to offline the PDU based on whether the predicted tenant availability measure is below the availability threshold.

12. A method according to claim 8, wherein the capacity information indicating net available capacity of a computing resource of the datacenter comprises a prediction of future capacity of the datacenter.

13. A method according to claim 8, wherein the datacenter comprises a compute cloud comprised of a control fabric, and wherein the capacity information and tenant availability information are obtained from the control fabric.

14. A computing device comprising:
 processing hardware;
 storage hardware storing information configured to cause the processing hardware to perform a process, the process comprising:
  determining that a power distribution unit (PDU) of a datacenter is in a faulty state, the PDU supplying power to computer hosts of the datacenter while in the faulty state, the PDU comprising a controller that does not respond to power-control messages while in the faulty state, and based on the determining that the PDU is in the faulty state:
   determining whether to make the PDU unavailable to the computer hosts supplied thereby by
    (i) computing, based on assuming unavailability of whichever tenant virtual machines (VMs) are on the computer hosts being supplied power by the PDU, a level of availability of tenant VMs in the datacenter, and determining whether the level of availability of tenant VMs in the datacenter is below a threshold, and by
    (ii) computing a level of capacity of a computing resource provided by the computer hosts of the datacenter exclusive of the computer hosts being supplied the resource by the PDU, and determining whether the level of capacity of the computing resource is below a threshold.

15. A computing device according to claim 14, wherein the level of capacity comprises an estimate of a net unused amount of the computing resource in the datacenter or of a given set of computing hosts thereof.

16. A computing device according to claim 14, wherein the determining whether to make the PDU unavailable to the computer hosts supplied the power thereby is further based on a number of VMs rendered unavailable due to the unavailability of the PDU.

17. A computing device according to claim 14, wherein the number of VMs rendered unavailable is computed based on whether VMs under the PDU comprise tenant VMs.

* * * * *